(12) United States Patent
Hucker et al.

(10) Patent No.: US 11,067,276 B2
(45) Date of Patent: Jul. 20, 2021

(54) IGNITER SEAL ARRANGEMENT FOR A COMBUSTION CHAMBER

(71) Applicant: ROLLS-ROYCE plc, London (GB)

(72) Inventors: Paul A Hucker, Bristol (GB); Stephen C Harding, Bristol (GB); Iain Morgan, Braunton (GB)

(73) Assignee: ROLLS-ROYCE plc, London (GB)

( * ) Notice: Subject to any disclaimer, the term of this patent is extended or adjusted under 35 U.S.C. 154(b) by 239 days.

(21) Appl. No.: 16/355,111

(22) Filed: Mar. 15, 2019

(65) Prior Publication Data
US 2019/0293294 A1 Sep. 26, 2019

(30) Foreign Application Priority Data
Mar. 23, 2018 (GB) ...................... 1804656

(51) Int. Cl.
| | |
|---|---|
| F23R 3/00 | (2006.01) |
| H01T 13/08 | (2006.01) |
| F23R 3/06 | (2006.01) |
| F02C 7/266 | (2006.01) |
| F02C 7/264 | (2006.01) |

(52) U.S. Cl.
CPC .............. *F23R 3/002* (2013.01); *H01T 13/08* (2013.01); *F02C 7/264* (2013.01); *F02C 7/266* (2013.01);
(Continued)

(58) Field of Classification Search
CPC . F02C 7/266; F02C 7/28; H01T 13/08; F05D 2260/99; F05D 2260/30;
(Continued)

(56) References Cited

U.S. PATENT DOCUMENTS

| | | |
|---|---|---|
| 2007/0068166 A1 | 3/2007 | Gautier et al. |
| 2009/0151361 A1 | 6/2009 | Audin et al. |

(Continued)

FOREIGN PATENT DOCUMENTS

| | | |
|---|---|---|
| EP | 1342954 A1 | 9/2003 |
| EP | 1424469 A2 | 6/2004 |

(Continued)

OTHER PUBLICATIONS

Sep. 14, 2018 Search Report issued in Great Britian Patent Application No. 1804656.5.
(Continued)

*Primary Examiner* — Craig Kim
*Assistant Examiner* — Stephanie Sebasco Cheng
(74) *Attorney, Agent, or Firm* — Oliff PLC

(57) ABSTRACT

An igniter seal arrangement for a combustion chamber. The combustion chamber has a wall having first surface and second surfaces. A boss projects from the first surface, and has a platform on its remote end. The platform has an inner surface spaced from the first surface of the wall to define a chamber between the first surface of the wall and the inner surface of the platform. The platform has an outer surface facing away from the first surface of the wall and an aperture extends through the wall from the outer surface of the platform of the boss to the second surface. First and second L-shape rails extend from the platform and a sealing member has a first edge and a second edge locatable between the outer surface of the platform and the first and second L-shape rails and the sealing member has an aperture to receive an igniter.

22 Claims, 10 Drawing Sheets

(52) U.S. Cl.
CPC ...... *F05D 2230/30* (2013.01); *F05D 2240/55* (2013.01); *F23R 3/06* (2013.01); *F23R 2900/00012* (2013.01); *F23R 2900/00017* (2013.01)

(58) Field of Classification Search
CPC ............. F05D 2260/36; F05D 2230/64; F05D 2230/642; F05D 2230/644; F05D 2240/55–59; F23R 3/002; F23R 3/02; F23R 3/04; F23R 3/045; F23R 3/06; F23R 3/343; F23R 2900/00012; F23R 2900/00017; F23R 2900/00018; F23R 2900/03041–03045
See application file for complete search history.

(56) References Cited

U.S. PATENT DOCUMENTS

| | | | |
|---|---|---|---|
| 2010/0212324 A1* | 8/2010 | Bronson | F23R 3/06 60/752 |
| 2012/0255275 A1 | 10/2012 | Bunel et al. | |
| 2014/0352275 A1 | 12/2014 | McCormick | |
| 2014/0352323 A1 | 12/2014 | Bennett et al. | |
| 2015/0040568 A1* | 2/2015 | Stastny | F23R 3/002 60/722 |
| 2015/0135719 A1 | 5/2015 | Gerendas | |
| 2016/0025221 A1 | 1/2016 | Penz | |
| 2016/0115873 A1 | 4/2016 | Toon | |
| 2016/0258624 A1 | 9/2016 | Harding et al. | |

FOREIGN PATENT DOCUMENTS

| | | |
|---|---|---|
| EP | 1508743 A2 | 2/2005 |
| EP | 2644996 A2 | 10/2013 |
| FR | 2957975 A1 | 9/2011 |
| GB | 2445576 A | 7/2008 |
| WO | 2015/108584 A2 | 7/2015 |

OTHER PUBLICATIONS

Jul. 25, 2019 Search Report issued in European Patent Application No. 19162877.

* cited by examiner

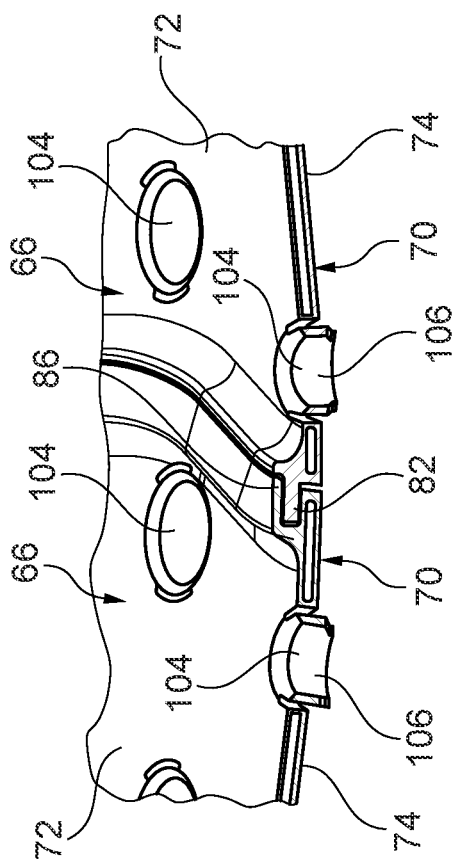
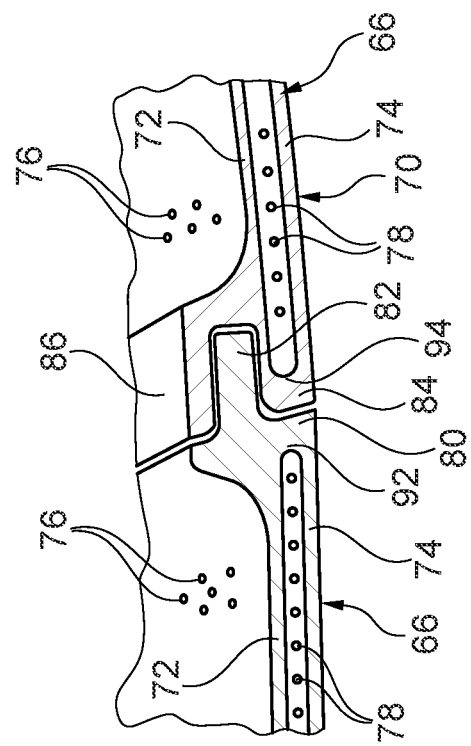
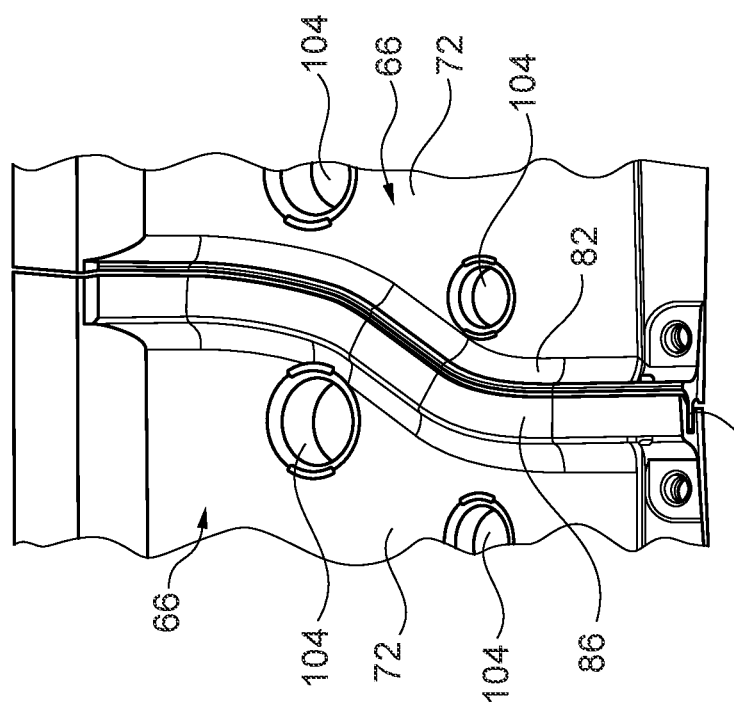

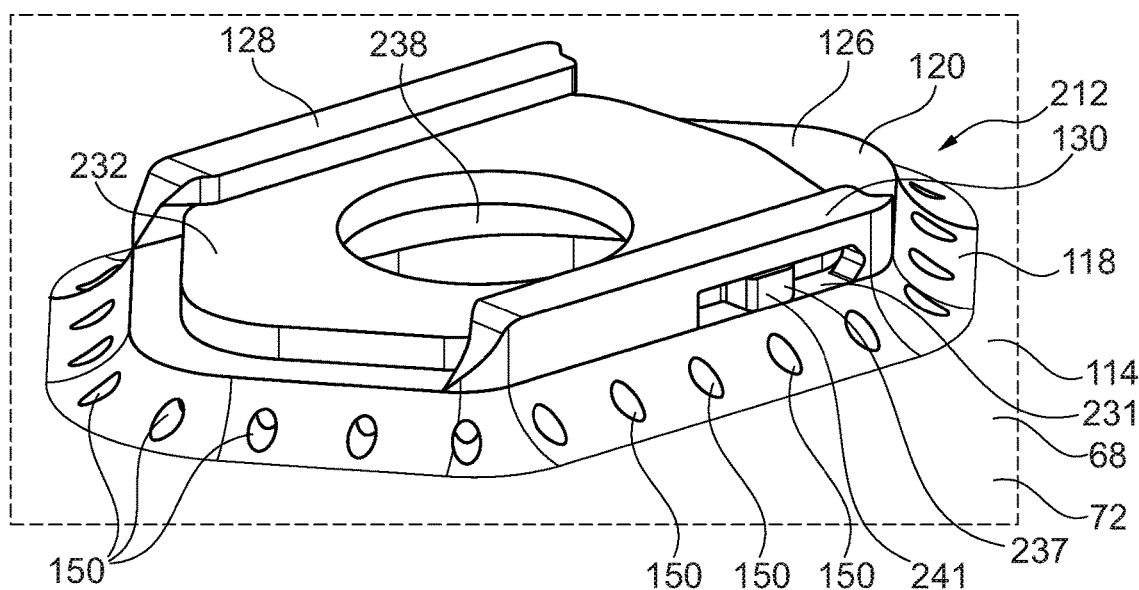
Fig. 15
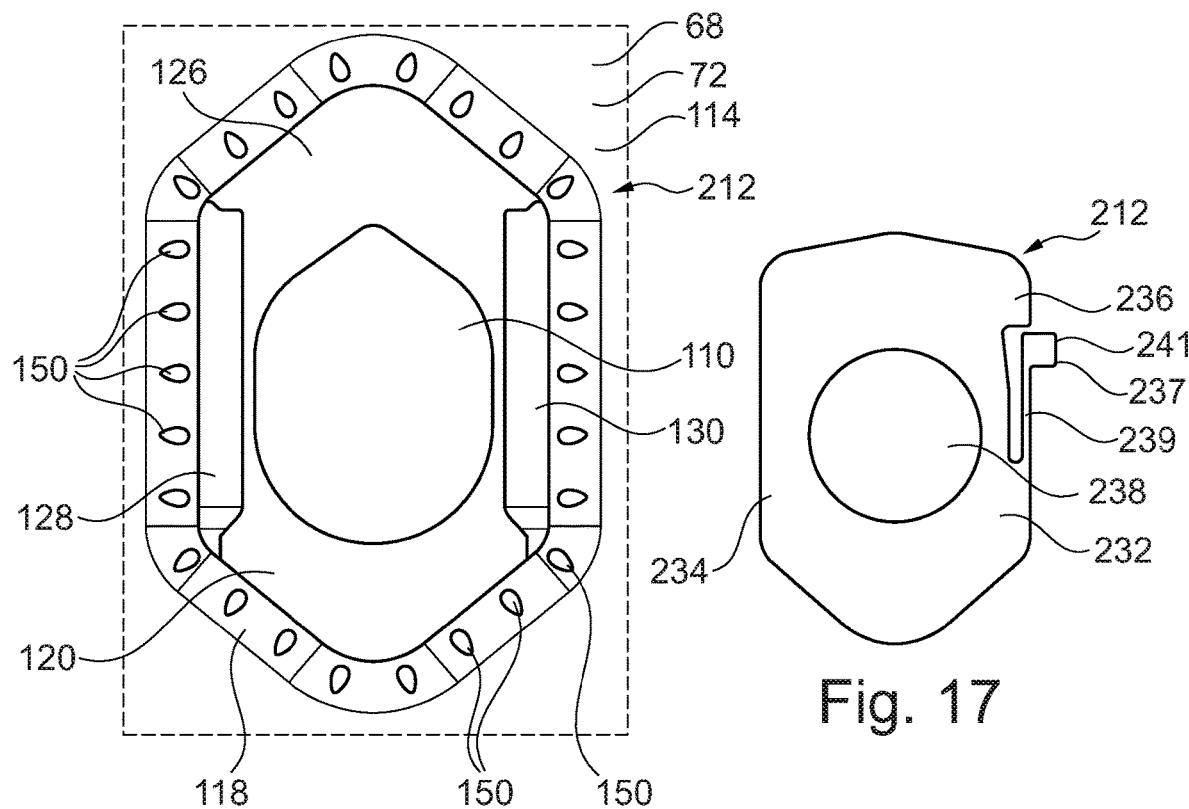
Fig. 16
Fig. 17

IGNITER SEAL ARRANGEMENT FOR A COMBUSTION CHAMBER

The present disclosure relates to an igniter seal arrangement for a combustion chamber and in particular to an igniter seal arrangement for a combustion chamber of a gas turbine engine.

A gas turbine engine combustion chamber is provided with one or more igniters, e.g. electric spark igniters, to ignite the fuel and air mixture in the combustion chamber. Normally there is a minimum of two igniters, to provide a backup in case one of the igniters fails. The igniters extend through and are secured to a combustion chamber outer casing and protrude into the combustion chamber.

Conventionally, a tubular igniter tower extends from the wall of the combustion chamber towards the combustion chamber outer casing, the igniter extends through the igniter tower and into the combustion chamber and a floating seal is provided within the igniter tower and tightly around the igniter.

However, the tubular igniter tower extends across an outer annular flow of air between the combustion chamber and the combustion chamber outer casing. The igniter tower produces a wake in the flow of air which affects the supply of cooling air to the combustion chamber downstream of the igniter tower. Thus, additional cooling air is required to cool the combustion chamber downstream of and in the wake of the igniter tower.

The igniter tower is manufactured as a separate component and is welded onto the wall of the combustion chamber. It is necessary to avoid cooling features in the wall of the combustion chamber in the heat affected zone of the weld.

The present disclosure seeks to provide a novel igniter seal arrangement which reduces, or overcomes, the above mentioned problems.

According to a first aspect there is provided an igniter seal arrangement for a combustion chamber, the combustion chamber comprising a combustion chamber wall, the combustion chamber wall having a first surface and a second surface, a boss projecting from the first surface of the combustion chamber wall, the boss having a platform on a remote end of the boss, the boss comprising a wall extending from the first surface of the combustion chamber wall, the platform being arranged on a remote end of the wall, the wall being arranged at and supporting a periphery of the platform, the platform having an inner surface spaced from the first surface of the combustion chamber wall to define a chamber between the first surface of the combustion chamber wall, the inner surface of the platform and the wall, the platform having an outer surface facing away from the first surface of the combustion chamber wall, an aperture extending through the combustion chamber wall from the outer surface of the platform of the boss to the second surface of the combustion chamber wall, first and second L-shape rails extending from the platform and a sealing member having a first edge and a second edge locatable between the outer surface of the platform and the first and second L-shape rails, and the sealing member having an aperture to receive an igniter.

The aperture may have a tear drop shape in the platform and the combustion chamber wall.

The first and second L-shape rails may be parallel.

There may be at least one stop member at, or adjacent, a first end of the platform to limit movement of the sealing member in a first direction along the rails. There may be two stop members at or adjacent the first end of the platform.

There may be at least one stop member at, or adjacent, a second end of the platform to limit movement of the sealing member in a second opposite direction along the rails.

The sealing member may have at least one guide member to guide the igniter into the aperture in the sealing member.

The guide member may be a frusta-conical member. There may be two guide members. Each of the guide members may be a part frusto-conical member, e.g. extends through an angle of less than 180°.

The boss may have a generally hexagonal shape. The boss may have a generally hexagonal shaped base. The boss may have a fillet radius between the first surface of the combustion chamber wall and the platform of the boss. The platform may have a generally hexagonal shape. The sealing member may have a generally hexagonal shape.

The boss may have a generally pentagonal shape. The boss may have a generally pentagonal shaped base. The boss may have a fillet radius between the first surface of the combustion chamber wall and the platform of the boss. The platform may have a generally pentagonal shape. The sealing member may have a generally pentagonal shape The boss may have a plurality of apertures extending there-through to the chamber between the first surface of the combustion chamber wall and the inner surface of the platform.

The combustion chamber wall may have a plurality of apertures extending there-through from the first surface of the combustion chamber wall within the chamber to the second surface of the combustion chamber wall.

The aperture in the sealing member may have a corrugated surface to provide passages between the sealing member and the igniter.

The sealing member may be temporarily attached to the platform by a frangible connection. The frangible connection may be arranged at a first end of the platform.

The first end of the platform may be a corner of the hexagonal shape platform. The two stop members limiting movement of the sealing member in the first direction along the rails may be arranged on the two sides of the hexagonal shape platform intersecting the corner at the first end of the platform. The stop member limiting movement of the sealing member in the second direction along the rails may be at a corner at the second end of the platform. The frangible connection may be arranged at the corner at the first end of the platform.

At least one edge of the sealing member may have a spring clip and the corresponding L-shape rail having a slot to receive the spring clip on the at least one edge of the sealing member. Both edges of the sealing member may have a spring clip and each L-shape rail having a slot to receive the spring clip of the corresponding one of the edges of the sealing member.

A further wall may be provided extending from the first surface of the combustion chamber wall to the platform to form a continuous aperture from the outer surface of the platform of the boss to the second surface of the combustion chamber wall, the chamber being defined between the first surface of the combustion chamber wall, the inner surface of the platform, the wall and the further wall. The further wall may have a plurality of apertures extending there-through from the chamber to the aperture. A connecting wall may extend from the boss to the further wall. The connecting wall may extend from a corner at a first end of a hexagonal shape boss. The platform may have a plurality of apertures extending there-through from the chamber to the outer surface of the platform.

The combustion chamber wall and the boss may be a unitary, monolithic, structure, e.g. the combustion chamber wall, the boss, the L-shape rails, the at least one stop may be a unitary, monolithic, structure or the combustion chamber wall, the boss, the L-shape rails, the at least one stop, the further wall and the interconnecting wall may be a unitary, monolithic, structure.

The combustion chamber wall may comprise an outer wall and an inner wall spaced from the outer wall, the first surface is an outer surface of the outer wall and the second surface is an inner surface of the inner wall.

The outer wall and the inner wall may be a unitary, monolithic, structure. The outer wall and the inner wall may be connected by a first end wall at a first end, a second end wall at a second end, a first edge wall at a first edge and a second edge wall at a second edge to form a wall segment. The outer wall, the inner wall, the first end wall, the second end wall, the first end wall and the second end wall may be a unitary, monolithic, structure.

A plurality of wall segments may be arranged to define an annular combustion chamber wall, one or more of the segments may have an igniter seal arrangement.

The combustion chamber may be a tubular combustion chamber, an annular combustion chamber or a tubo-annular combustion chamber. The combustion chamber may be a gas turbine engine combustion chamber.

According to a second aspect there is provided a method of manufacturing an igniter seal arrangement for a combustion chamber, the combustion chamber comprising a combustion chamber wall, the combustion chamber wall having a first surface and a second surface, a boss projecting from the first surface of the combustion chamber wall, the boss having a platform on a remote end of the boss, the boss comprising a wall extending from the first surface of the combustion chamber wall, the platform being arranged on a remote end of the wall, the wall being arranged at and supporting a periphery of the platform, the platform having an inner surface spaced from the first surface of the combustion chamber wall to define a chamber between the first surface of the combustion chamber wall, the inner surface of the platform and the wall, the platform having an outer surface facing away from the first surface of the combustion chamber wall, an aperture extending through the combustion chamber wall from the outer surface of the platform of the boss to the second surface of the combustion chamber wall, first and second L-shape rails extending from the platform and a sealing member having a first edge and a second edge locatable between the outer surface of the platform and the first and second L-shape rails, and the sealing member having an aperture to receive an igniter, the method comprising manufacturing at least the combustion chamber wall, the boss and the L-shaped rails by additive manufacturing.

According to a third aspect there is provided a gas turbine engine for an aircraft comprising:

an engine core comprising a turbine, a compressor, and a core shaft connecting the turbine to the compressor;
a fan located upstream of the engine core, the fan comprising a plurality of fan blades; and
a gearbox that receives an input from the core shaft and outputs drive to the fan so as to drive the fan at a lower rotational speed than the core shaft, wherein: the core engine comprising a combustion chamber,
the combustion chamber having an igniter seal arrangement, the combustion chamber comprising a combustion chamber wall, the combustion chamber wall having a first surface and a second surface, a boss projecting from the first surface of the combustion chamber wall, the boss having a platform on a remote end of the boss, the boss comprising a wall extending from the first surface of the wall, the platform being arranged on a remote end of the wall, the wall being arranged at and supporting a periphery of the platform, the platform having an inner surface spaced from the first surface of the combustion chamber wall to define a chamber between the first surface of the combustion chamber wall, the inner surface of the platform and the wall, the platform having an outer surface facing away from the first surface of the combustion chamber wall, an aperture extending through the combustion chamber wall from the outer surface of the platform of the boss to the second surface of the combustion chamber wall, first and second L-shape rails extending from the platform and a sealing member having a first edge and a second edge locatable between the outer surface of the platform and the first and second L-shape rails, and the sealing member having an aperture to receive an igniter.

The turbine may be a first turbine, the compressor is a first compressor, and the core shaft is a first core shaft;
the engine core further comprises a second turbine, a second compressor, and a second core shaft connecting the second turbine to the second compressor; and
the second turbine, second compressor, and second core shaft are arranged to rotate at a higher rotational speed than the first core shaft.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (ambient pressure 101.3 kPa, temperature 30 deg C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a blisk or a bling. Any suitable method may be used to manufacture such a blink or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 015 to 0.85, for example 0.76 to 0.84, for example 0.77 to 0.83, for example 0.78 to 0.82, for example 0.79 to 0.81, for example on the order of Mach 0.8, on the order of Mach 0.86 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 deg C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Embodiments will now be described by way of example only, with reference to the Figures, in which FIG. 1 is a sectional side view of a gas turbine engine.

FIG. 7 is a further enlarged perspective view of a cold side of portions of the edges of two adjacent combustion chamber segments shown in FIG. 5.

FIG. 8 is a cross-sectional view through portions of the edges of two adjacent combustion chamber segments shown in FIG. 7.

FIG. 9 is a further enlarged cross-sectional view through the portions of the edges of two adjacent combustion chamber segments shown in FIG. 8.

FIG. 15 is an enlarged perspective view of an alternative igniter seal arrangement.

FIG. 16 is an enlarged plan view of the igniter seal arrangement shown in FIG. 15 without the sealing member.

FIG. 17 is a plan view of the sealing member shown in FIG. 15.

Figure 1:
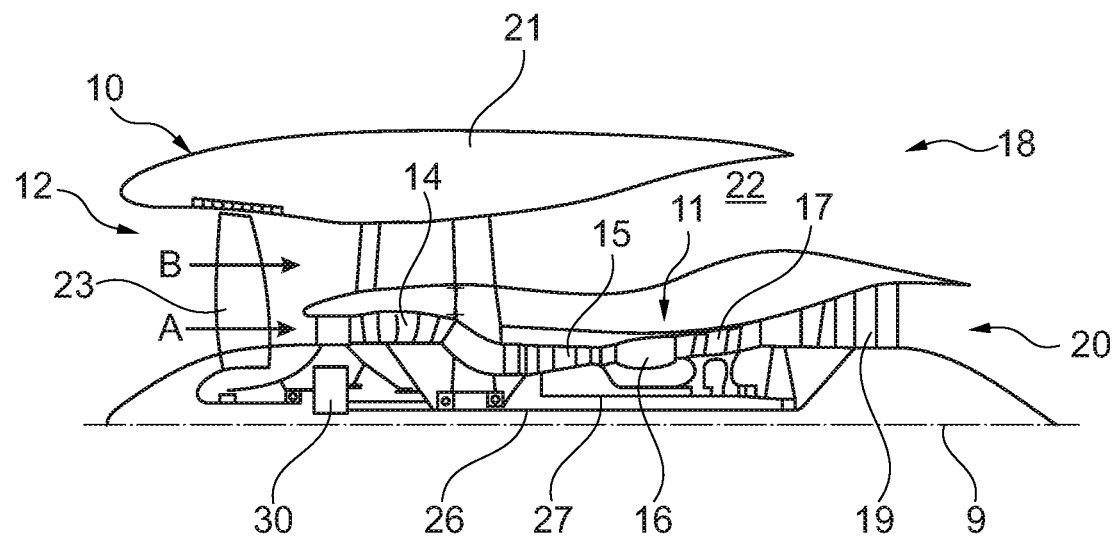

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
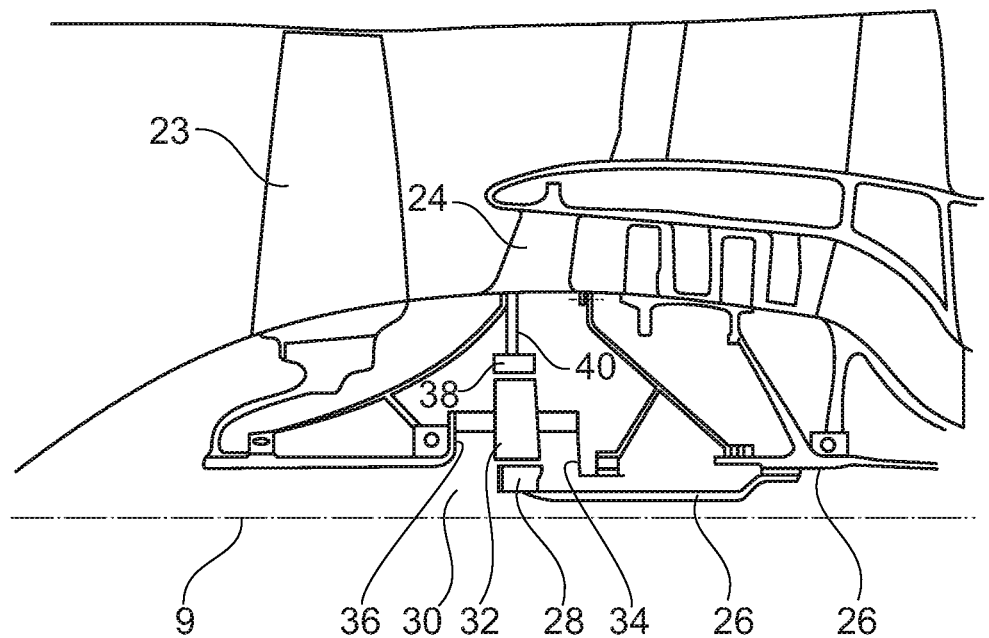
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to process around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor", Where such alternative nomenclature is used, the fan 23 may be referred to as a first, or lowest pressure, compression stage.

Figure 3:
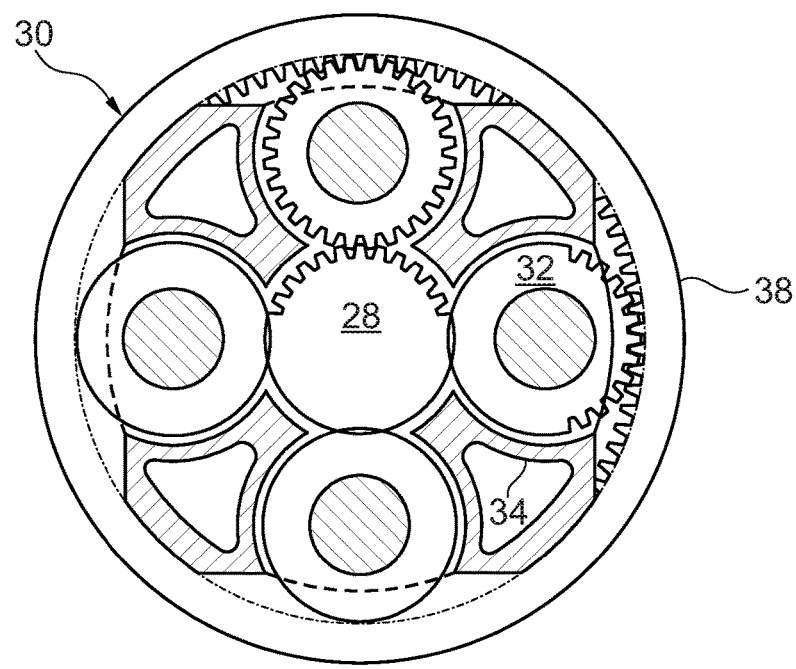
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2. Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
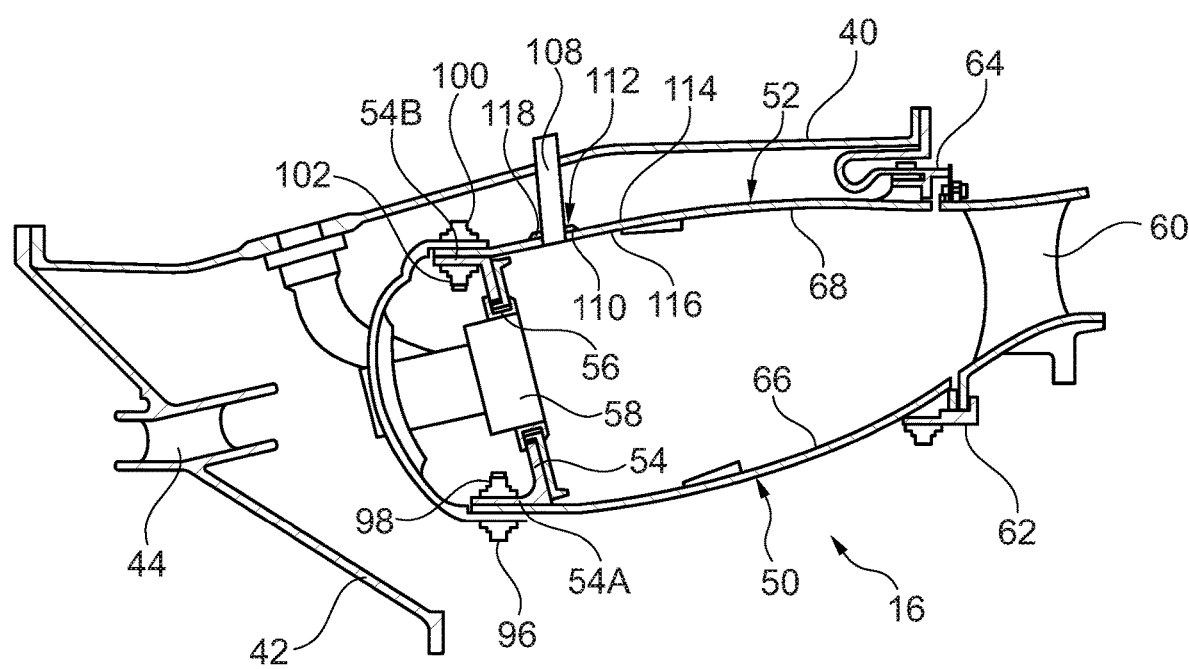
FIG. 4 is sectional side view through a combustion chamber of a gas turbine engine showing an igniter seal arrangement.

The combustion equipment 16, as shown more clearly in FIG. 4, is an annular combustion chamber and comprises a radially inner annular wall structure 50, a radially outer annular wall structure 52 and an upstream end wall structure 54. The upstream end of the radially inner annular wall structure 50 is secured to the upstream end wall structure 54 and the upstream end of the radially outer annular wall structure 52 is secured to the upstream end wall structure 54. The upstream end wall structure 54 has a plurality of circumferentially spaced apertures 56 and each aperture 56 has a respective one of a plurality of fuel injectors 58 located therein. The fuel injectors 58 are arranged to supply fuel into the annular combustion chamber 16 during operation of the gas turbine engine 10. A plurality of circumferentially arranged turbine nozzle guide vanes 60 are positioned axially downstream of the combustion chamber 16 and arranged to direct the hot gases from the combustion chamber 16 into the high pressure turbine 17. The radially inner ends of the turbine nozzle guide vanes 60 are secured to a radially inner discharge nozzle 62 and the radially outer ends of the turbine nozzle guide vanes 60 are secured to a radially outer discharge nozzle 64. A radially outer combustion chamber casing 40 is arranged radially around the annular combustion chamber 16 and a radially inner combustion chamber casing 42 is arranged radially within the annular combustion chamber 16. A plurality of circumferentially arranged compressor outlet guide vanes 44 are positioned axially upstream of the combustion chamber 16 and are arranged to supply air to the combustion chamber 16. The compressor outlet guide vanes 44 are connected to the radially outer combustion chamber casing 40 and to the radially inner combustion chamber casing 42. One or more igniters 108 are provided to ignite the fuel injected into the combustion chamber 16. The igniters, electric spark igniters, 108 are located in circumferentially spaced apertures 110 in the radially outer annular wall structure 52. The fuel injectors 58 are secured to the radially outer combustion chamber casing 40 and extend through apertures in the radially outer combustion chamber casing 40. The igniters 108 are secured to the radially outer combustion chamber casing 40 and extend through apertures in the radially outer combustion chamber casing 40.

The radially inner discharge nozzle 62 forms a radially inner downstream ring structure and the radially outer discharge nozzle 64 forms a radially outer downstream ring structure. The upstream end wall structure 54 has an inner annular flange 54A extending in an axially upstream direction therefrom and an outer annular flange 54B extending in an axially upstream direction therefrom. The upstream end wall structure 54 forms a radially inner upstream ring structure and a radially outer upstream ring structure. The radially inner annular wall structure 50 of the annular combustion chamber 16 and the radially outer annular wall structure 52 of the annular combustion chamber 16 comprise a plurality of circumferentially arranged combustion chamber segments 66 and 68 respectively. It is to be noted that the combustion chamber segments 66, 68 extend the full axial, longitudinal, length of the combustion chamber 16.

Figure 5:
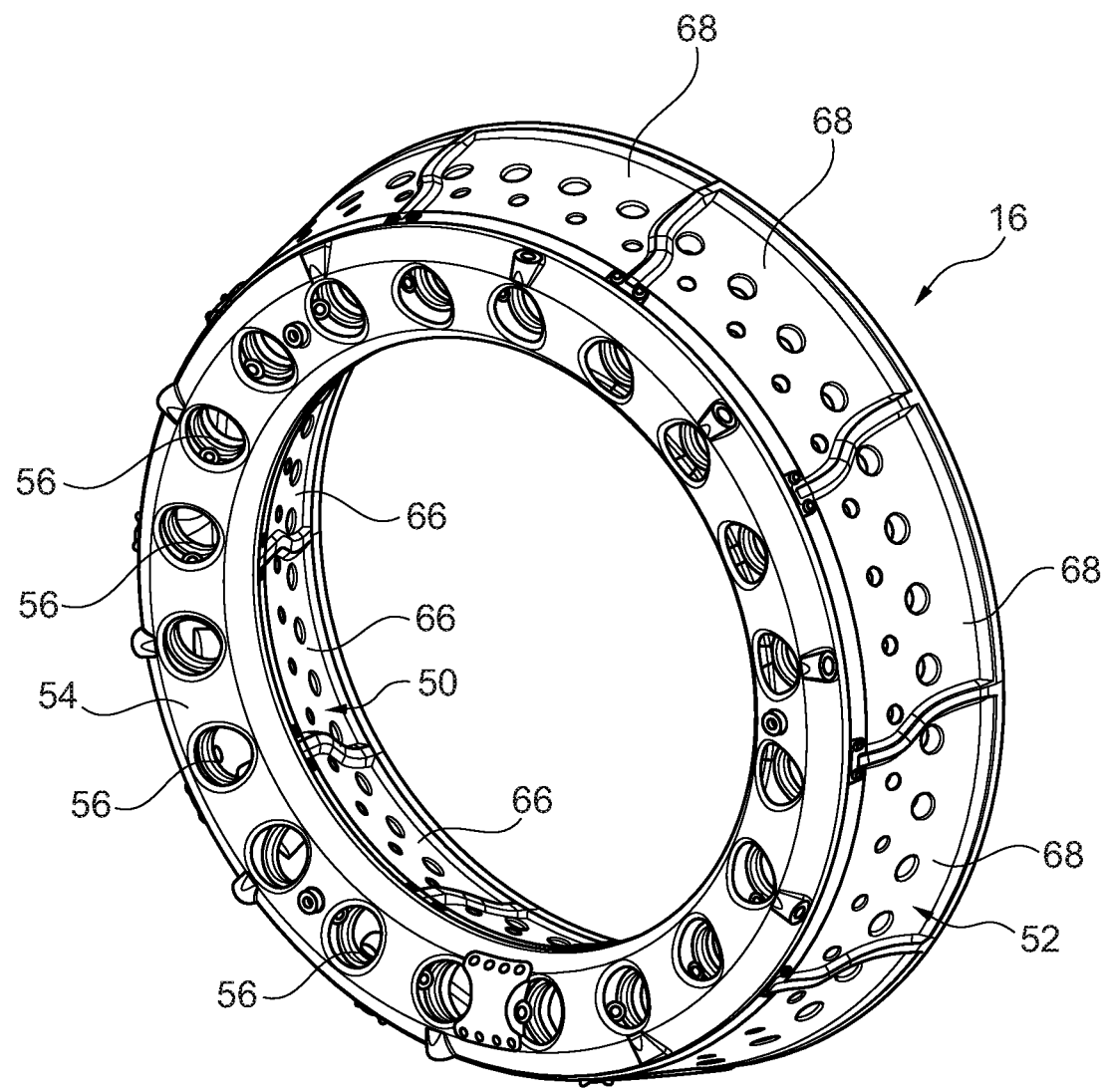
FIG. 5 is an enlarged perspective view of the combustion chamber comprising combustion chamber segments.
Figure 6:
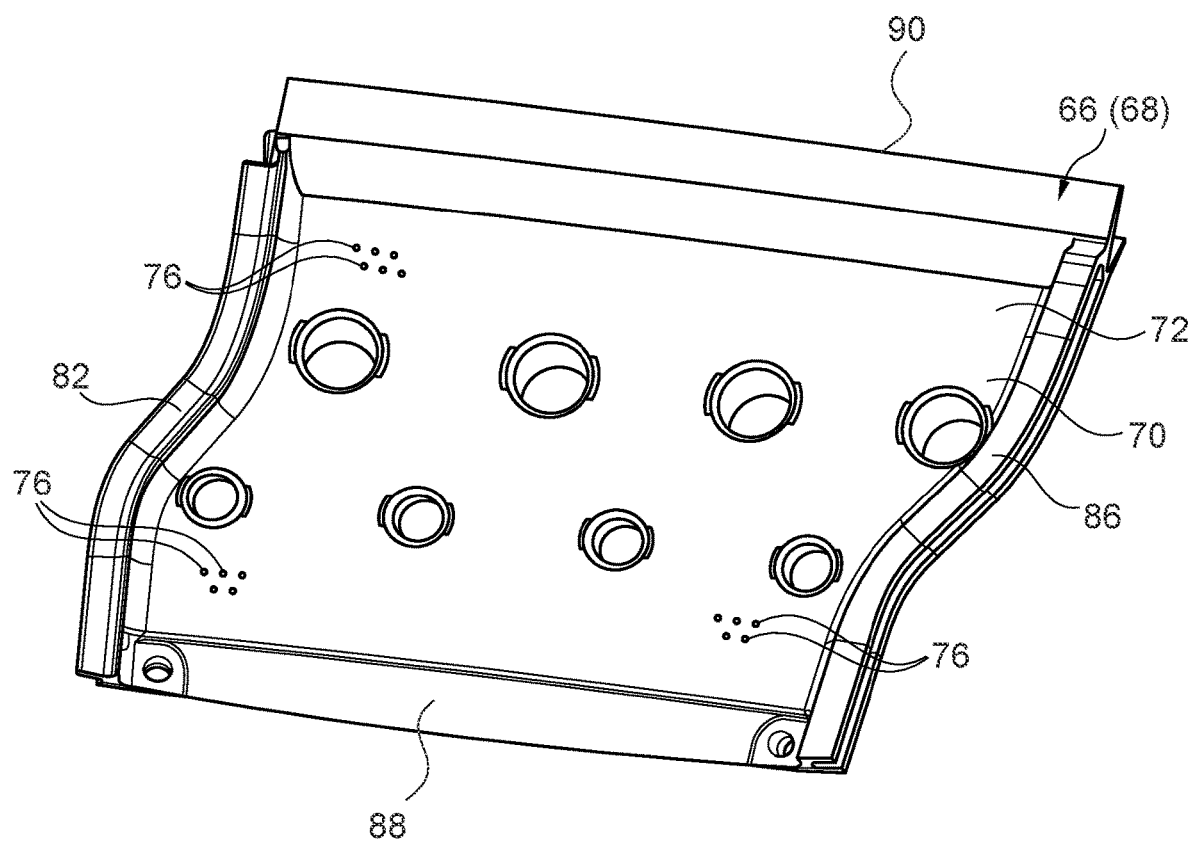
FIG. 6 is a further enlarged perspective view of a cold side of a combustion chamber segment shown in FIG. 5.
Figure 10:
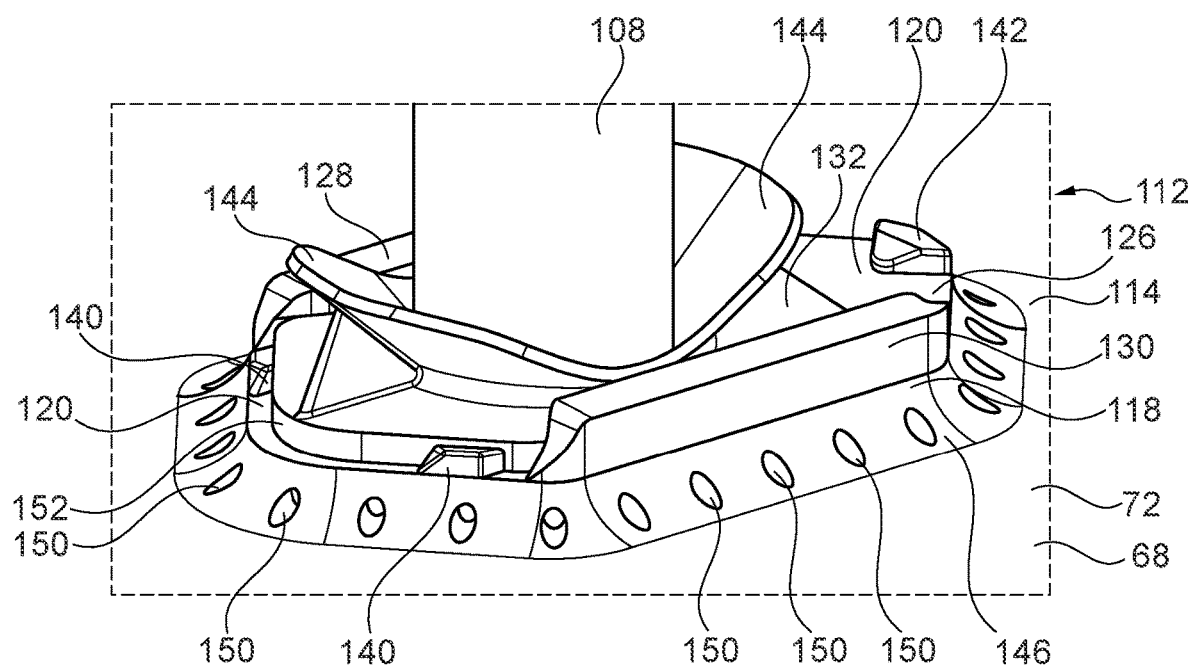
FIG. 10 is an enlarged perspective view of an igniter seal arrangement.

The circumferential arrangement of combustion chamber segments 66 and 68 of the radially inner and radially outer annular wall structures 50 and 52 of the annular combustion chamber 16 are clearly shown in FIG. 5. In this example there are ten combustion chamber segments 68 and ten combustion chamber segments 66 and each combustion chamber segment 68 and 66 extends through an angle of 36°. Other suitable numbers of combustion chamber segments 68 and 66 may be used, e.g. two, three, four, five, six, eight or twelve, and the number of combustion chamber segments 68 may be the same as or different to the number of combustion chamber segments 66. It is preferred that each of the combustion chamber segments extends through the same angle, but it may be possible to arrange the combustion chamber segments to extend through different angles.

Each combustion chamber segment 66 and 68, as shown in FIGS. 6 to 9, comprises a box like structure 70 including an outer wall 72 and an inner wall 74 spaced from the outer wall 72. The outer wall 72 and the inner wall 74 are arcuate. FIGS. 6 to 9 show a combustion chamber segment 66 of the radially inner annular wall structure 50. The outer wall 72 has a plurality of apertures 76 for the supply of coolant into the box like structure 70 and the inner wall 74 has a plurality of apertures 78 for the supply of coolant out of the box like structure 70. A first edge 80 of the box like structure 70 has a first hook 82 extending from the outer wall 72 and away from the inner wall 74. The first hook 82 extends at least a portion of the axial, longitudinal, length of the box like structure 70 and the first hook 82 is arranged at a first radial distance from the outer wall 72. A second edge 84 of the box like structure 70 has a second hook 86 extending from the outer wall 72 and away from the inner wall 74. The second hook 86 extends at least a portion of the axial, longitudinal, length of the box like structure 70, the second hook 86 is arranged at a second radial distance from the outer wall 72 and the second radial distance is greater than the first radial distance. The first hook 82 of each combustion chamber segment 66, 68 engages the outer wall 72 at the second edge 84 of an adjacent combustion chamber segment 66, 68 and the second hook 86 of each combustion chamber segment 66, 68 engages the first hook 82 of an adjacent combustion chamber segment 66, 68 to form a seal and to distribute loads between the adjacent combustion chamber segments 66, 68 and to maintain a circular profile, shape, for the radially inner, or radially outer, annular wall structure 50 and 52 of the annular combustion chamber 16, e.g. to prevent dislocation of the combustion chamber segments 66, 68. Thus, the first hook 82 of each combustion chamber segment 66, 68 contacts, abuts, or is in close proximity to the surface of the outer wall 72 at the second edge 84 of the adjacent combustion chamber segment 66, 68 and the second hook 86 of each combustion chamber segment 66, 68 contacts, abuts, or is in close proximity to the surface of the first hook 82 at the first edge 80 of the adjacent combustion chamber segment 66, 68. The first hook 82 of each combustion chamber segment 68 is arranged radially outwardly of the outer wall 72 at the second edge 84 of the adjacent combustion chamber segment 68 and the second hook 86 of each combustion chamber 68 is arranged radially outwardly of the first hook 82 at the first edge 80 of the adjacent combustion chamber segment 68. Similarly, the first hook 820 of each combustion chamber segment 66 is arranged radially inwardly of the outer wall 72 at the second edge 84 of the adjacent combustion chamber segment 66 and the second hook 86 of each combustion chamber 66 is arranged radially inwardly of the first hook 82 at the first edge 80 of the adjacent combustion chamber segment 66.

The upstream end of each combustion chamber segment 66, 68 is secured to the upstream ring structure and the downstream end of each combustion chamber segment is mounted on the downstream ring structure. Thus, the upstream end of each combustion chamber segment 66 is secured to the upstream ring structure, e.g. the upstream end wall structure, 54 and the downstream end of each combustion chamber segment 66 is mounted on the radially inner downstream ring structure, e.g. the radially inner discharge nozzle, 60. Similarly, the upstream end of each combustion chamber segment 68 is secured to the upstream ring structure, e.g. the upstream end wall structure, 54 and the downstream end of each combustion chamber segment 68 is mounted on the radially outer downstream ring structure, e.g. the radially outer discharge nozzle, 60.

The first hook 82 extends the length of the box like structure 70 between a securing arrangement and a mounting arrangement and the second hook 86 also extends the length of the box like structure 70 between the securing arrangement and the mounting arrangement. The securing arrangement and the mounting arrangement are discussed further below.

However, it may be possible for the first hook to extend the full length of the box like structure and for the second hook to extend the full length of the box like structure. Alternatively, it may be possible for the first hook to extend only a part of the full length of the box like structure and for the second hook to extend only a part of the full length of the box like structure. Additionally, it may be possible for there to be a plurality of first hooks arranged along the length of the box like structure and for there to be a number of second hooks arranged along the length of the box like structure.

The box like structure 70 of each combustion chamber segment 66, 68 has a first end wall 88 extending from a first, upstream, end of the outer wall 72 to a first, upstream, end of the inner wall 74, a second end wall 90 extending from a second, downstream and opposite, end of the outer wall 72 to a second, downstream and opposite, end of the inner wall 72. A first edge wall 92 extending from a first circumferential edge of the outer wall 72 to a first circumferential edge of the inner wall 74, a second edge wall 94 extending from a second, opposite circumferential, edge of the outer wall 72 to a second, opposite circumferential, edge of the inner wall 74 to form the box like structure 70.

Each combustion chamber segment 66, 68 is secured to the upstream end wall structure 54 by one or more bolts. The upstream end of each combustion chamber segment 66 is removably secured to the inner annular flange 54A of the upstream end wall structure 54 by bolts 96 and cooperating nuts 98 and similarly the upstream end of each combustion chamber segment 68 is removably secured to the outer annular flange 54B of the upstream end wall structure 64 by bolts 100 and cooperating nuts 102. Alternatively, rivets may be to secure the combustion chamber segment 66, 68 to the upstream end wall structure 54.

Each combustion chamber segment 66 is mounted on the radially inner downstream ring structure, e.g. the radially inner discharge nozzle, 62. Each combustion chamber segment 68 is mounted on the radially outer downstream ring structure, e.g. the radially outer discharge nozzle, 64.

The outer wall 72 of each combustion chamber segment 66, 68 has at least one dilution aperture 104, the inner wall 74 of each combustion chamber segment 66, 68 has at least one dilution aperture 106 aligned with the corresponding dilution aperture 104 in the outer wall 72. In this example there are a plurality of dilution apertures 104 and corresponding dilution apertures 106. However, if the combustion chamber is a lean burn combustion chamber the combustion chamber segments 66, 68 are not provided with dilution apertures.

Each of the apertures 110 in the radially outer annular wall structure 52 is provided with an igniter seal arrangement 112 for the combustion chamber 16, as shown more clearly in FIGS. 10 to 14. The radially outer annular wall structure 52 has a first surface 114 and a second surface 116. The first surface 114 is an outer surface of the outer wall 72 of a combustion chamber segment 68 and the second surface is an inner surface of the inner wall 74 of the combustion chamber segment 68. A boss 118 projects from the first surface 114 of the outer wall 72 and the boss 118 has a platform 120 on a remote end of the boss 118. The boss 118 also comprises a wall 119 extending from the first surface 114 of the outer wall 72 to the platform 120 and the platform 120 is arranged on a remote end of the wall 119. The wall 119 is arranged at and supports the periphery of the platform 120. The platform 120 has an inner surface 122 spaced from the first surface 114 of the outer wall 72 to define a chamber 124 between the first surface 114 of the outer wall 72 of the combustion chamber segment 68, the inner surface 122 of the platform 120 and the wall 119 of the boss 118. The platform 120 has an outer surface 126 facing away from the first surface 114 of the outer wall 72 and the aperture 110 extends through the combustion chamber segment 68 of the radially outer annular wall structure 52 from the outer surface 126 of the platform 120 of the boss 118 to the second surface 116 of the inner wall 74 of the combustion chamber segment 68 of the radially outer annular wall structure 52. First and second L-shape rails 128 and 130 respectively extend from the platform 120 and a sealing member 132 has first and second edges 134 and 136 which are locatable between the outer surface 126 of the platform 120 and the first and second L-shape rails 128 and 130 respectively. The sealing member 132 has an aperture 138 to receive an igniter 108.

The aperture 110 has a tear drop shape, and in particular the aperture 110 has a generally elliptical shape but one end of the aperture 110 has two straight sides rather than a curve, in the platform 120 and in the outer wall 72 and the inner wall 74 of the combustion chamber segment 68 of the radially outer annular wall structure 52. The aperture 110 is arranged such that the two straight sides are at the downstream end of the aperture 110. The first and second L-shape rails 128 and 130 are parallel and extend generally axially with respect to the axis of the engine 10, e.g. the L-shape rails 128 and 130 are circumferentially spaced apart with respect to the axis of the engine 10. There is at least one stop member 140 at, or adjacent, a first end, an upstream end, of the platform 120 to limit movement of the sealing member 132 in a first direction, in this example an upstream direction, along the rails 128 and 130. In this example there are two stop members 140 at or adjacent the first end of the platform 120. There is at least one stop member 142 at, or adjacent, a second end, a downstream end, of the platform 120 to limit movement of the sealing member 132 in a second opposite direction, a downstream direction, along the rails 128 and 130.

The sealing member 132 has at least one guide member 144 to guide the igniter 108 into the aperture 138 in the sealing member 132. The guide member 144 may be a conical member. In this example there are two guide members 144 and each of the guide members 144 is a part frusto-conical member, e.g. extends through an angle of less than 180°, for example 80°.

The boss 118 has a generally hexagonal shaped base 146 and the wall 119 of the boss 118 has a fillet radius between the first surface 114 of the outer wall 72 of the combustion chamber segment 68 of the radially outer annular wall structure 52 and the platform 120 of the boss 118. The platform 120 also has a generally hexagonal shape. The L-shape rails 128 and 130 are arranged on two parallel sides of the hexagonal platform 120. The two parallel sides with the L-shape guides 128 and 130 are longer than the remainder of the sides of the hexagonal platform 120. The sealing member 132 has a generally pentagonal shape or a generally hexagonal shape.

The boss 118 has a plurality of apertures 150 extending through the wall 119 to the chamber 124 between the first surface 114 of the outer wall 72 of the combustion chamber segment 66 of the radially outer annular wall 52, the inner surface 122 of the platform 120 and the wall 119 of the boss 118.

The outer wall 72 and the inner wall 74 of the combustion chamber segment 68 have a plurality of apertures extending there-through from the first surface 114 of the outer wall 72 of the combustion chamber segment 68 within the chamber 124 to the second surface 116 of the inner wall 74 of the combustion chamber segment 68.

The aperture 138 in the sealing member 132 may have a corrugated surface to provide passages between the sealing member 132 and the igniter 108.

Figures 11, 12:
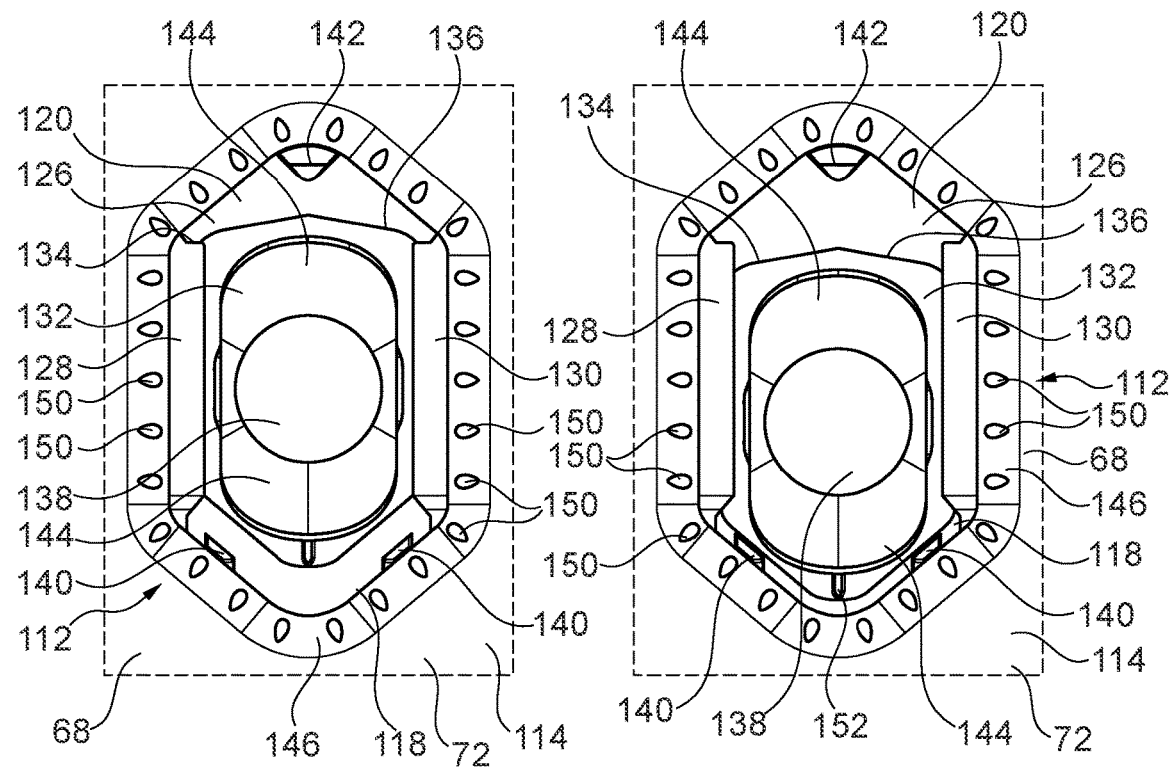
FIG. 11 is an enlarged plan view of the igniter seal arrangement shown in FIG. 10 with a sealing member in a first position.
FIG. 12 is an enlarged plan view of an igniter seal arrangement shown in FIG. 10 with the sealing member in a second position.
Figure 13:
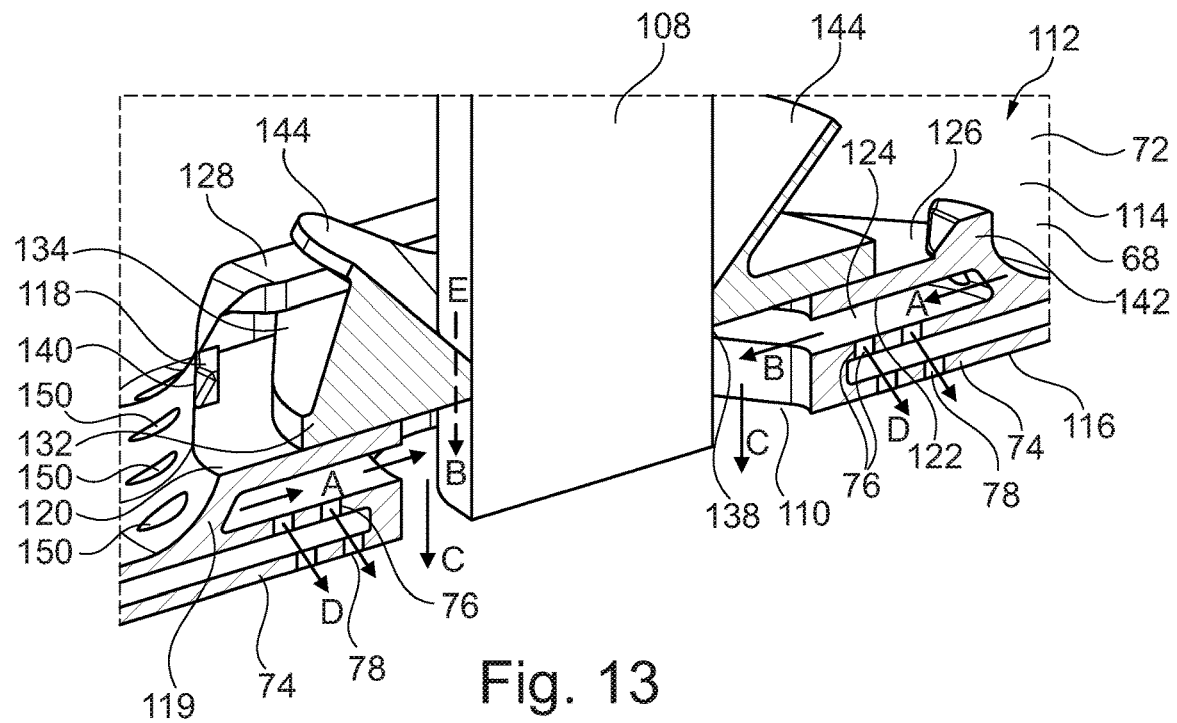
FIG. 13 is an enlarged perspective cross-sectional view through the igniter seal arrangement shown in FIG. 10 in a plane containing the axis of the combustion chamber.
Figure 14:
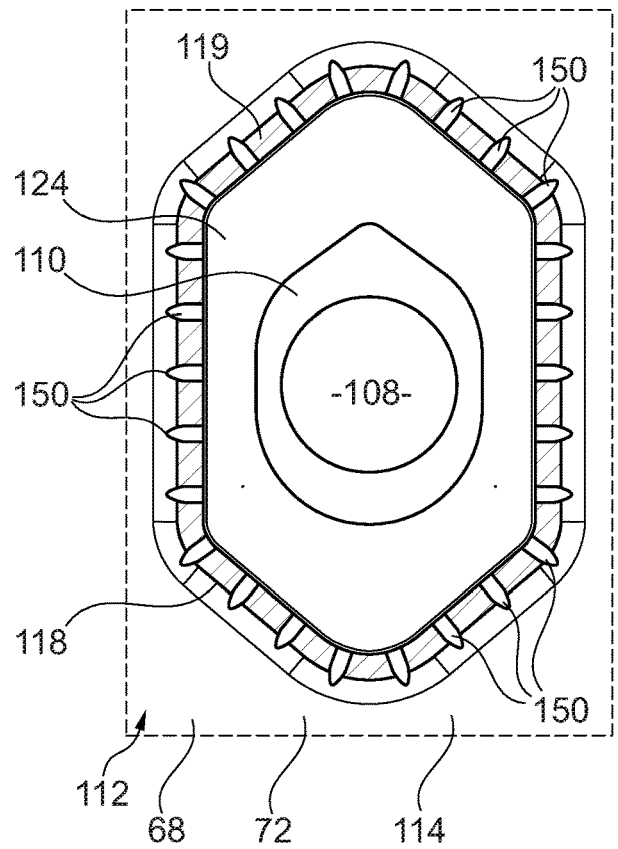
FIG. 14 is an enlarged cross-sectional view through the igniter seal arrangement shown in FIG. 10 in a plane perpendicular to that shown in FIG. 13.
Figure 18:
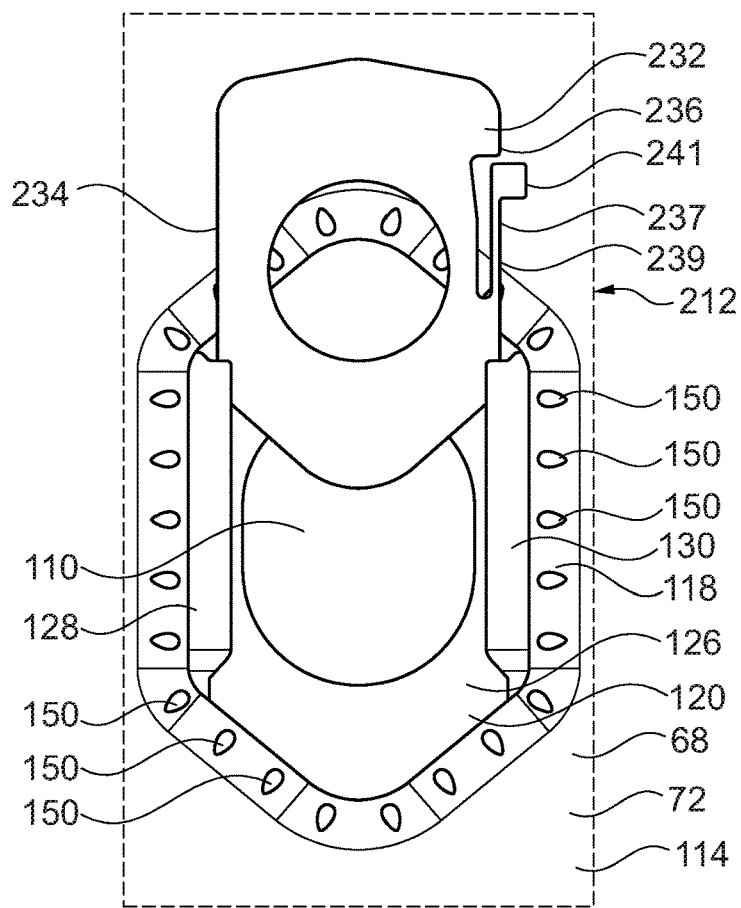
FIG. 18 is an enlarged plan view of the igniter seal arrangement shown in FIG. 15 showing insertion of the sealing member.

The sealing member 132 is temporarily attached to the platform 120 by a frangible connection 152. The frangible connection 152 is arranged at the first end of the platform 120, as shown in FIG. 12.

Thus, the first end of the platform 120 is a corner of the hexagonal shape platform 120. The two stop members 140 limiting movement of the sealing member 132 in the first direction along the L-shape rails 128 and 130 are arranged on the two sides of the hexagonal shape platform 120 intersecting the corner at the first end of the platform 120. The stop member 142 limiting movement of the sealing member 132 in the second direction along the L-shape rails 128 and 130 is at a corner at the second end of the platform 120. The frangible connection 152 is arranged at the corner at the first end of the platform 120.

However, in a further example the boss 118 has a generally pentagonal shaped base 146, the platform 120 has a generally pentagonal shape, the L-shape rails 128 and 130 are arranged on two parallel sides of the pentagonal platform 120 and the two parallel sides with the L-shape guides 128 and 130 are longer than the remainder of the sides of the pentagonal platform 120. The first end of the platform 120 is a corner of the pentagonal shape platform 120. The two stop members 140 limiting movement of the sealing member 132 in the first direction along the L-shape rails 128 and 130 are arranged on the two sides of the pentagonal shape platform 120 intersecting the corner at the first end of the platform 120. The stop member 142 limiting movement of the sealing member 132 in the second direction along the L-shape rails 128 and 130 is on the base of the pentagonal shape platform at the second end of the platform 120. The frangible connection 152 is arranged at the corner at the first end of the platform 120.

In the igniter sealing arrangement 112 of FIGS. 10 to 14, the outer wall 72, the inner wall 74, the boss 118, the wall 119, the platform 120, the L-shape rails 128 and 130, the at least one stop 140 and the at least one stop 142 is a unitary, monolithic, structure in operation. However, in the as built condition the igniter seal arrangement 112 of FIGS. 10 to 14, the outer wall 72, the inner wall 74, the boss 118, the wall 119, the platform 120, the L-shape rails 128 and 130, the at least one stop 140, the at least one stop 142, the frangible connection 152 and the sealing member 132 is a unitary, monolithic, structure.

Thus, if the radially outer wall structure 52 comprises a plurality of combustion chamber segments 68, one or more of the combustion chamber segments 68 has an igniter sealing arrangement 112. A combustion chamber segment 68 with an igniter sealing arrangement 112 comprises the outer wall 72, the inner wall 74, the outer wall 72 and the inner wall 74 are connected by a first end well at a first end, a second end wall at a second end, a first edge wall at a first edge and a second edge wall at a second edge to form the combustion chamber segment 68 and the boss 118, the wall 119, the platform 120, the L-shape rails 128 and 130, the at least one stop 140 and the at least one stop 142 all of which is a unitary, monolithic, structure in operation.

However, in the as built condition a combustion chamber segment 68 with an comprises the outer wall 72, the inner wall 74, the outer wall 72 and the inner wall 74 are connected by a first end wall at a first end, a second end wall at a second end, a first edge wall at a first edge and a second edge wall at a second edge to form the combustion chamber segment 68 and the boss 118, the wall 119, the platform 120, the L-shape rails 128 and 130, the at least one stop 140, the at least one stop 142, the frangible connection 152 and the sealing member 132 all of which is a unitary, monolithic, structure.

In operation coolant, e.g. air, A is supplied through the apertures 150 in the wall 119 into the chamber 124 and some of the coolant, air, B in the chamber 124 is directed to impinge on the igniter 108 and then to flow C over the igniter 108 and through the aperture 110 in the inner wall 74 into the combustion chamber 16. Some of the coolant, air, D in the chamber 124 flows through the apertures 76 and 78 in the outer and inner walls 72 and 74 respectively to provide cooling of the combustion chamber segment 68, e.g. impingement cooling of the inner wall 74 and then effusion cooling of the inner wall 74 of the combustion chamber segment 68. If the sealing member 132 has an aperture 138 with a corrugated surface additional coolant, e.g. air, E may flow through the aperture 138 and over the surface of the igniter 108 to cool the igniter 108 and then flow through the aperture 110 into the combustion chamber 16.

The igniter seal arrangement 112 is manufactured by additive layer manufacturing, e.g. by laser powder bed or electron beam powder bed. The igniter seal arrangement 112 is built up layer by layer by fusing and sintering the powder material, powder metal, starting from the upstream end of the combustion chamber segment. The hexagonal, or pentagonal, shaped boss 118 and platform 120 enables the boss 118 to be built and the tear drop shape aperture 110 enables the aperture 110 to be built and the hexagonal, or pentagonal, shaped sealing member 132 and the frangible connection 152 enables the sealing member 132 to be built. Once the sealing arrangement 132 has been built the frangible connection 152 is broken, by suitable machining process or otherwise, to allow the sealing member 132 to move relative to the boss 118. The sealing member 132 is spaced a small distance, 0.25 microns, from the platform 120, the L-shaped rails 128 and 130 and the stops 140 during additive manufacture. The combustion chamber segment, the wall, the platform, the L-shaped rails and the stops of the boss and the sealing member are all made of the same material, e.g. a superalloy, e.g. a nickel base superalloy, a cobalt base superalloy or an iron base superalloy.

Alternatively each of the apertures 110 in the radially outer annular wall structure 52 is provided with an igniter seal arrangement 212 for the combustion chamber 16, as shown more clearly in FIGS. 15 to 18. The igniter seal arrangement 212 is substantially the same as that shown in FIGS. 10 to 14 and like parts are denoted by like numerals. The igniter seal arrangement 212 differs in that at least one edge 236 of the sealing member 232 has a spring clip 237 and the corresponding L-shape rail 130 has a slot 231 to receive the spring clip 237 on the at least one edge 236 of the sealing member 232. The spring clip 237 comprises an elongate resilient member 239 cantilevered of the edge 236 of the sealing member 232 and a projection 241 at the remote end of the member 239. The projection 241 extends away from the edges 236 of the sealing member 232. In use the projection 241 is depressed to allow the sealing member 232 to slide along and under the L-shape rails 128 and 130 and the projection 241 is pushed away from the edge 236 and into the slot 231 to axially retain the sealing member 232. In another arrangement, not shown, both edges of the sealing member have a spring clip and each L-shape rail has a slot to receive the spring clip of the corresponding one of the edges of the sealing member. The sealing member 232 is easily replaced during engine maintenance if it has become worn. The sealing member 232 may be made from a different material to the material of the combustion chamber segment and the wall, the platform, the L-shape rails and the stops of the boss, e.g. a material which preferentially wears compared to the material of the combustion chamber segment, the wall, the platform, the L-shape rails and the stops of the boss. The combustion chamber segment, the wall, the platform, the L-shaped rails and the stops of the boss are all made of the same material, e.g. a superalloy, e.g. a nickel base superalloy, a cobalt base superalloy or an iron base superalloy.

The igniter seal arrangement 212 operates in substantially the same manner as that described with reference to FIGS. 10 to 13.

The igniter seal arrangement 212 is manufactured by additive layer manufacturing, e.g. by laser powder bed or electron beam powder bed. The igniter seal arrangement 112 is built up layer by layer by fusing and sintering the powder material, powder metal, starting from the upstream end of the combustion chamber segment. The hexagonal, or pentagonal, shaped boss 118 and platform 120 enables the boss 118 to be built and the tear drop shape aperture 110 enables the aperture 110 to be built. The sealing member 232 is manufactured separately and for example is manufactured from sheet metal via laser machining.

Figure 19:
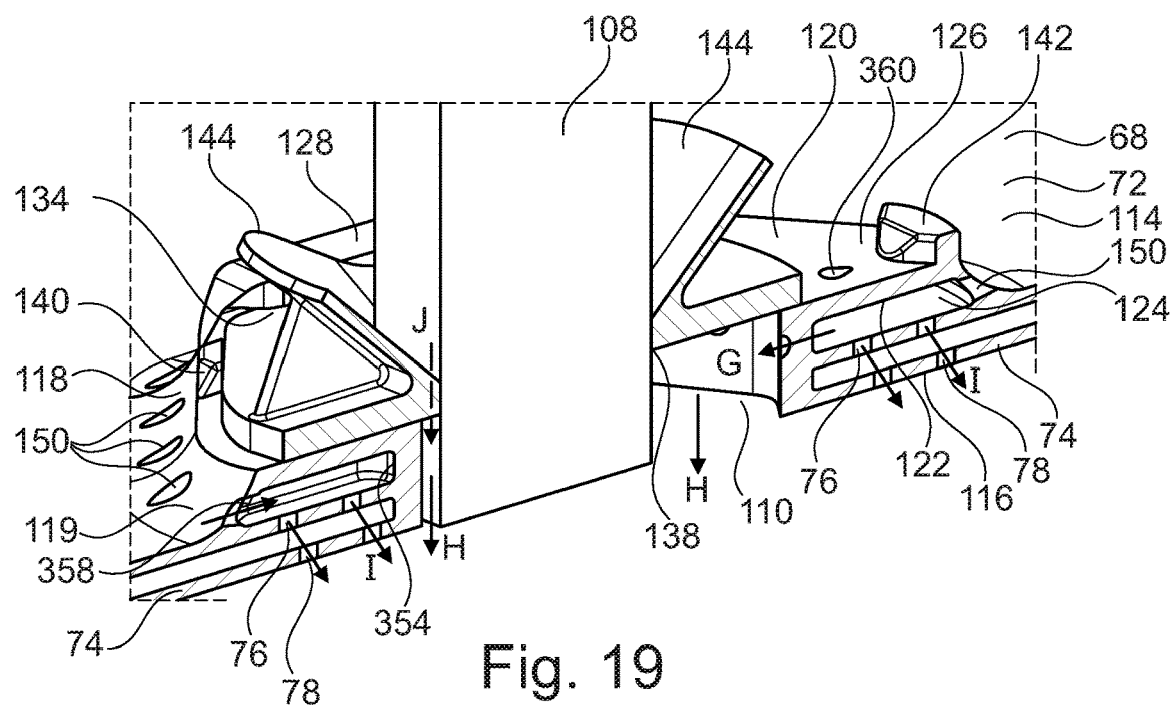
FIG. 19 is an enlarged alternative perspective cross-sectional view through the igniter seal arrangement shown in FIG. 10 in a plane containing the axis of the combustion chamber.
Figure 20:
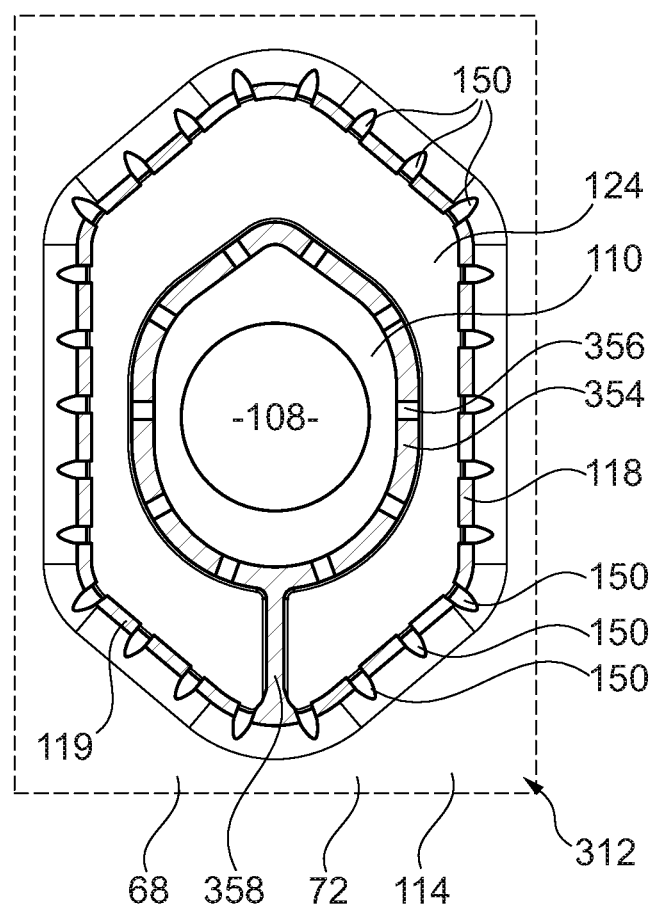
FIG. 20 is an enlarged cross-sectional view through the igniter seal arrangement shown in FIG. 10 in a plane perpendicular to that shown in FIG. 19.

A further igniter seal arrangement 312 for the combustion chamber 16 is shown more clearly in FIGS. 19 and 20. The igniter seal arrangement 312 is substantially the same as that shown in FIGS. 10 to 14 and like parts are denoted by like numerals. The wall 119 is again arranged at and supports the periphery of the platform 120. The igniter seal arrangement 312 differs in that a further wall 354 is provided extending from the first surface 114 of the outer wall 72 of the combustion chamber segment 68 of the radially outer annular wall 68 to the platform 120 to form a continuous aperture 110 from the outer surface 126 of the platform 120 of the boss 118 to the second surface 116 of the inner wall 74 of the combustion chamber segment 68 of the radially outer annular wall 52. The further wall 354 is spaced from the wall 119. The chamber 124 is defined between the first surface 114 of the outer wall 72 of the combustion chamber segment 68, the inner surface 122 of the platform 120, the wall 119 of the boss 118 and the further wall 354. The further wall 354 has a plurality of apertures 356 extending there-through from the chamber 124 to the aperture 110. A connecting wall 358 extends from the wall 119 of the boss 118 to the further wall 354. The connecting wall 354 extends from the corner at the first end of the hexagonal shape boss 118. The platform 122 has a plurality of apertures 360 extending there-through from the chamber 124 to the outer surface 126 of the platform 120.

In operation coolant, e.g. air, F is supplied through the apertures 150 in the wall 119 into the chamber 124 and some of the coolant, air, G in the chamber 124 is directed through apertures 356 in the further wall 354 to impinge on the igniter 108 and then to flow H over the igniter 108 and through the aperture 110 in the inner wall 74 into the combustion chamber 16. Some of the coolant I in the chamber 124 flows through the apertures 76 and 78 in the outer and inner walls 72 and 74 respectively to provide cooling of the combustion chamber segment 68, e.g. impingement cooling of the inner wall 74 and then effusion cooling of the inner wall 74 of the combustion chamber segment 68. If the sealing member 132 has an aperture 138 with a corrugated surface additional coolant, e.g. air, J may flow through the aperture 138 and over the surface of the igniter 108 to cool the igniter 108 and then flow through the aperture 110 into the combustion chamber 16.

The igniter seal arrangement 312 is also manufactured by additive layer manufacturing, e.g. by laser powder bed or electron beam powder bed. The igniter seal arrangement 312 is built up layer by layer by fusing and sintering the powder material, powder metal, starting from the upstream end of the combustion chamber segment. The hexagonal, or pentagonal, shaped boss 118 and platform 120 enables the boss 118 to be built and the tear drop shape aperture 110 enables the aperture 110 to be built, the connecting wall 358 enables the further wall 354 to be built and the hexagonal, or pentagonal, shaped sealing member 132 and the frangible connection 152 enables the sealing member 132 to be built. The apertures 360 enable unfused powder material in the chamber 124 to be removed. The combustion chamber segment, the wall, the platform, the L-shaped rails and the stops of the boss and the sealing member are all made of the same material, e.g. a superalloy, e.g. a nickel base superalloy, a cobalt base superalloy or an iron base superalloy.

Alternatively the further igniter seal arrangement 312 for the combustion chamber 16 shown in FIGS. 19 and 20 may have the sealing member 232 and the L-shape rail 130 with a slot 231 as shown in FIGS. 15 to 18. This igniter seal arrangement is manufactured by additive layer manufacturing, e.g. by laser powder bed or electron beam powder bed. The igniter seal arrangement is built up layer by layer by fusing and sintering the powder material, powder metal, starting from the upstream end of the combustion chamber segment. The hexagonal, or pentagonal, shaped boss 118 and platform 120 enables the boss 118 to be built and the tear drop shape aperture 110 enables the aperture 110 to be built. The sealing member 232 is manufactured separately and for example is manufactured from sheet metal via laser machining. The combustion chamber segment, the wall, the platform, the L-shaped rails and the stops of the boss are all made of the same material, e.g. a superalloy, e.g. a nickel base superalloy, a cobalt base superalloy or an iron base superalloy. The sealing member may be made from a different material to the material of the combustion chamber segment and the wall, the platform, the L-shape rails and the stops of the boss, e.g. a material which preferentially wears compared to the material of the combustion chamber segment, the wall, the platform, the L-shape rails and the stops of the boss.

In all of the igniter seal arrangements the L-shape rails limit radial and circumferential movement of the sealing member and the stops limit axial movement of the sealing member.

The boss of the present disclosure extends across only a relatively short distance into the outer annular flow of air between the combustion chamber and the combustion chamber outer casing compared to the igniter tower. The boss of the present disclosure produces a significantly smaller wake in the flow of air which affects the supply of cooling air to the combustion chamber than the igniter tower. Thus, less cooling air is required to cool the combustion chamber downstream of and in the wake of the boss than compared to the wake downstream of the igniter tower. The boss of the present disclosure is manufactured as an integral part of the wall of the combustion chamber compared to igniter tower which is manufactured as a separate component and is welded onto the wall of the combustion chamber. This enables cooling features in the wall of the combustion chamber because there isn't a heat affected zone due to a weld.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. An igniter seal arrangement for a combustion chamber, the combustion chamber comprising a combustion chamber wall, the combustion chamber wall having a first surface and a second surface, a boss projecting from the first surface of the combustion chamber wall, the boss having a platform on a remote end of the boss, the boss comprising a wall extending from the first surface of the combustion chamber wall, the platform being arranged on a remote end of the wall, the wall being arranged at and supporting a periphery of the platform, the platform having an inner surface spaced from, and facing, the first surface of the combustion chamber wall to define a chamber between the first surface of the combustion chamber wall, the inner surface of the platform and the wall, the platform having an outer surface facing away from the first surface of the combustion chamber wall, an aperture extending through the combustion chamber wall from the outer surface of the platform of the boss to the second surface of the combustion chamber wall, first and second L- shape rails extending from the platform and a sealing member having a first edge and a second edge, the first edge of the sealing member locatable between the outer surface of the platform and an opposing surface of the first L-shape rail and the second edge of the sealing member locatable between the outer surface of the platform and an opposing surface of the second L-shape rail, and the sealing member having an aperture to receive an igniter.

2. An igniter seal arrangement as claimed in claim 1 wherein the aperture extending through the combustion chamber wall from the outer surface of the platform of the boss to the second surface of the combustion chamber wall has a tear drop shape in the platform and the combustion chamber wall.

3. An igniter seal arrangement as claimed in claim 1 wherein the first and second L-shape rails are parallel.

4. An igniter seal arrangement as claimed in claim 1 wherein there is at least one stop member at, or adjacent, a first end of the platform to limit movement of the sealing member in a first direction along the rails.

5. An igniter seal arrangement as claimed in claim 4 wherein the at least one stop member comprises two stop members at or adjacent the first end of the platform.

6. An igniter seal arrangement as claimed in claim 4 wherein there is at least one other stop member at, or adjacent, a second end of the platform to limit movement of the sealing member in a second direction opposite the first direction along the rails.

7. An igniter seal arrangement as claimed in claim 1 wherein the sealing member has at least one guide member to guide the igniter into the aperture in the sealing member.

8. An igniter seal arrangement as claimed in claim 1 wherein the boss has a generally hexagonal shaped base, the platform has a generally hexagonal shape and the sealing member has a generally hexagonal shape.

9. An igniter seal arrangement as claimed in claim 1 wherein the boss has a generally pentagonal shaped base, the platform has a generally pentagonal shape and the sealing member has a generally pentagonal shape.

10. An igniter seal arrangement as claimed in claim 1 wherein the boss has a plurality of cooling apertures extending there-through to the chamber, the plurality of cooling apertures located between the first surface of the combustion chamber wall and the inner surface of the platform.

11. An igniter seal arrangement as claimed in claim 1 wherein the combustion chamber wall has a plurality of cooling apertures extending there-through from the first surface of the combustion chamber wall within the chamber to the second surface of the combustion chamber wall.

12. An igniter seal arrangement as claimed in claim 1 wherein the sealing member is temporarily attached to the platform by a frangible connection.

13. An igniter seal arrangement as claimed in claim 12 wherein the frangible connection is arranged at a first end of the platform.

14. An igniter seal arrangement as claimed in claim 1 wherein the at least one of the first edge of the sealing member or the second edge of the sealing member has a spring clip and the corresponding first L-shape rail or second L-shape rail having a slot to receive the spring clip.

15. An igniter seal arrangement as claimed in claim 14 wherein both the first and second edges of the sealing member each have a spring clip and each of the first and second L-shape rails having a slot to receive the spring clip of the corresponding one of the first and second edges of the sealing member.

16. An igniter seal arrangement as claimed in claim 1 wherein a further wall is provided extending from the first surface of the combustion chamber wall to the platform such that the aperture extending through the combustion chamber wall from the outer surface of the platform of the boss to the second surface of the combustion chamber wall is a continuous aperture, the chamber being defined between the first surface of the combustion chamber wall, the inner surface of the platform, the wall and the further wall.

17. An igniter seal arrangement as claimed in claim 16 wherein the further wall has a plurality of cooling apertures extending there-through from the chamber to the aperture extending through the combustion chamber wall from the outer surface of the platform of the boss to the second surface of the combustion chamber wall.

18. An igniter seal arrangement as claimed in claim 16 wherein a connecting wall extends from the boss to the further wall.

19. An igniter seal arrangement as claimed in claim 16 wherein the platform has a plurality of cooling apertures extending there-through from the chamber to the outer surface of the platform.

20. An igniter seal arrangement as claimed in claim 1 wherein the combustion chamber wall and the boss are a unitary, monolithic, structure.

21. An igniter seal arrangement for a combustion chamber, the combustion chamber comprising a combustion chamber wall,
the combustion chamber wall having a first surface and a second surface, the combustion chamber wall comprises an outer wall and an inner wall spaced from the outer wall, the first surface is an outer surface of the outer wall and the second surface is an inner surface of the inner wall, the outer wall and the inner wall are connected by a first end wall at a first end, a second end wall at a second end, a first edge wall at a first edge and a second edge wall at a second edge to form a wall segment,
a boss projecting from the first surface of the combustion chamber wall, the boss having a platform on a remote end of the boss, the boss comprising a wall extending from the first surface of the combustion chamber wall, the platform being arranged on a remote end of the wall, the wall being arranged at and supporting a periphery of the platform, the platform having an inner surface spaced from, and facing, the first surface of the combustion chamber wall to define a chamber between the first surface of the combustion chamber wall, the inner surface of the platform and the wall, the platform having an outer surface facing away from the first surface of the combustion chamber wall, an aperture extending through the combustion chamber wall from the outer surface of the platform of the boss to the second surface of the combustion chamber wall, first and second L-shape rails extending from the platform and a sealing member having a first edge locatable between the outer surface of the platform and an opposing surface of the first L-shape rail and a second edge locatable between the outer surface of the platform and an opposing surface of the second L-shape rail, and the sealing member having an aperture to receive an igniter,
the outer wall, the inner wall, the first end wall, the second end wall, the first edge wall, the second edge wall and the boss are a unitary, monolithic, structure.

22. A method of manufacturing an igniter seal arrangement for a combustion chamber, the combustion chamber comprising a combustion chamber wall, the combustion chamber wall having a first surface and a second surface, a boss projecting from the first surface of the combustion chamber wall, the boss having a platform on a remote end of the boss, the boss comprising a wall extending from the first surface of the combustion chamber wall, the platform being arranged on a remote end of the wall, the wall being arranged at and supporting a periphery of the platform, the platform having an inner surface spaced from, and facing, the first surface of the combustion chamber wall to define a chamber between the first surface of the combustion chamber wall, the inner surface of the platform and the wall, the platform having an outer surface facing away from the first surface of the combustion chamber wall, an aperture extending through the combustion chamber wall from the outer surface of the platform of the boss to the second surface of the combustion chamber wall, first and second L-shape rails extending from the platform and a sealing member having a first edge locatable between the outer surface of the platform and the first L-shape rail and a second edge locatable between the outer surface of the platform and the second L-shape rail, and the sealing member having an aperture to receive an igniter, the method comprising manufacturing at least the combustion chamber wall, the boss and the L-shaped rails by additive manufacturing.

* * * * *